United States Patent Office 3,297,925
Patented Jan. 10, 1967

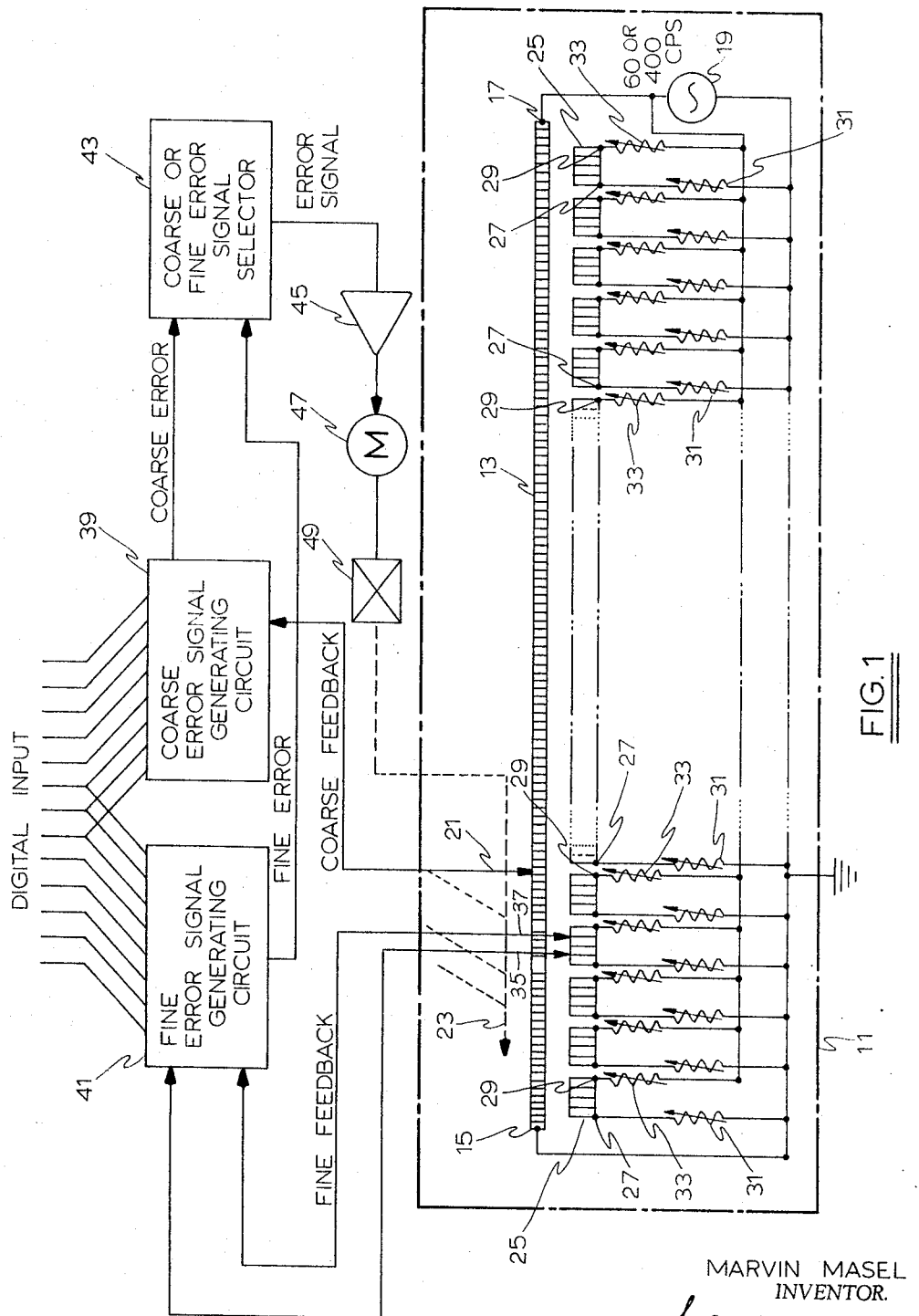

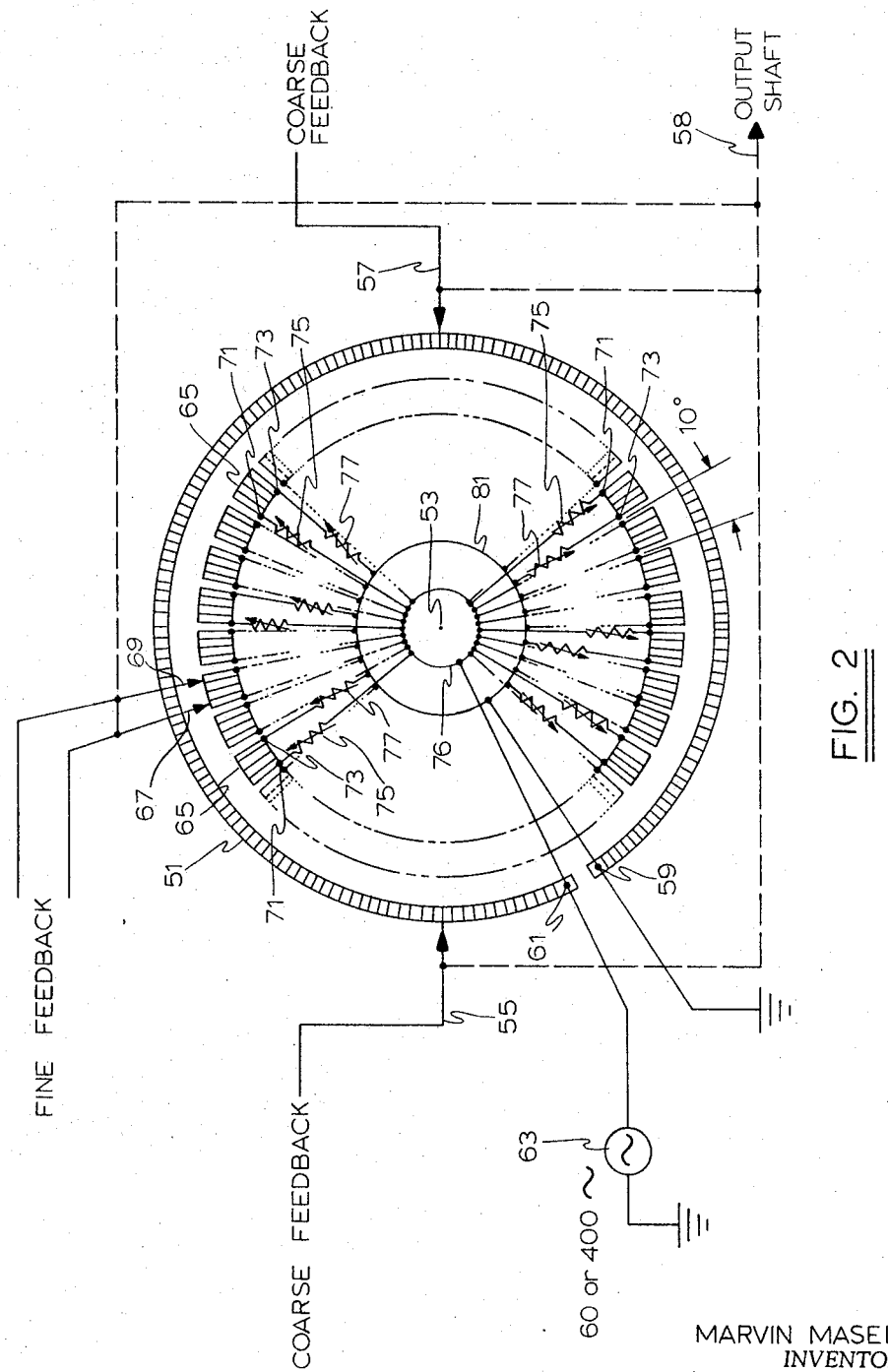

3,297,925
POSITION TRANSDUCER AND DIGITAL
SERVO SYSTEM
Marvin Masel, West Englewood, N.J., assignor to General Precision Inc., Little Falls, N.J., a corporation of Delaware
Filed Sept. 24, 1963, Ser. No. 311,092
2 Claims. (Cl. 318—28)

This invention relates to position transducers and a digital servo system in which such a position transducer is used.

The primary application of the position transducer of the present invention is in the positioning or measuring the position of a movable member with high accuracy. The digital servo system of the present invention is an application of the position transducer of the present invention, in which an output member is positioned precisely at a position indicated by an applied binary number. The position transducer in the present invention in effect accomplishes electrical gearing under conditions where mechanical gearing is too expensive or simply impossible. Furthermore in heavy machine tool applications a lead screw or rack and pinion will eventually wear and become less adequate as an accurate positioning device. The transducer of the present invention does not drive the movable member but merely measures its position and compares the position with the position indicated by a command signal. The accuracy of the position transducer of the present invention is on the order of one-thousandth of an inch regardless of total length and resolution is infinite.

Prior to the present invention accurate positioning was obtained by means of accurate position transducers such as inductosyns or multiple resolvers or by precision gearing. The positioning system of the present invention improves upon these systems of the prior art because it is less expensive, more reliable, and will operate accurately over a larger temperature range. Furthermore, its analog output may be easily converted into digital form and the output from the transducer serves as an absolute reference so there can be no error due to a miscount of pulses or interruption of power supply.

Accordingly an object of the present invention is to provide an improved position transducer.

Another object of the present invention is to provide an improved system for accurately positioning a movable member.

A further object of the present invention is to provide an improved system for accurately positioning a movable member in accordance with an applied digital signal.

A still further object of the present invention is to provide a highly accurate, reliable, relatively inexpensive position transducer.

A still further object of the present invention is to provide an analog position transducer, the output of which is easily converted into digital form.

These objects are accomplished in accordance with the present invention by means of a position transducer which comprises a long potentiometer resistor and several short potentiometer resistors distributed in a path along the long potentiometer resistor. A.C. power is applied across both the long and short potentiometer resistors and at least one brush is provided to make sliding contact with the long potentiometer resistor and two brushes are provided to make contact with the short potentiometer resistors. The brushes are fixed together and to the movable member, the position of which is to be measured. The resulting signal from the brush making contact with the long potentiometer resistor provides a coarse indication of the position of the movable member and the signals obtained from the brushes making contact with the short resistors provide a fine indication of the position of the movable member. This position transducer is used in the digital servo system of the present invention, which converts signals representing an applied digital number into analog signals, which are compared with the coarse and fine signals obtained from the position transducer. These signals then provide coarse and fine error signals which are used to drive the movable member precisely to the position indicated by the applied digital number.

Further objects and advantages of the present invention will become readily apparent as the following detailed description of the invention unfolds and when taken in conjunction with the drawings wherein:

FIG. 1 illustrates one embodiment of the position transducer of the present invention and the digital servo system of the present invention making use of this position transducer; and FIG. 2 illustrates another embodiment of the position transducer of the present invention.

In U.S. Patent No. 3,226,617, issued December 28, 1965 to Marvin Masel and Edgar J. Smith, and assigned to the same assignee as the present invention, there is disclosed a system for positioning an output shaft at an angular position precisely representing an applied binary number. As disclosed in this patent the system makes use of a single turn fine potentiometer and a 32-turn coarse potentiometer, the shafts of which are coupled together. The movable arm of the 32-turn potentiometer moves from one end of the potentiometer resistance to the other as the output shaft of the system is turned through 32 revolutions. The fine potentiometer has two movable arms and these move from one end of the potentiometer resistance to the other each time the output shaft turns through one revolution. The system coarsely positions its output shaft by comparing the more significant digits of the applied binary number with the position of the movable arm of the coarse potentiometer and precisely positions the output shaft by comparing the less significant digits of the applied binary number with the positions of the movable arms of the fine potentiometer. The system thus positions the output shaft at an angular position ranging through 32 revolutions precisely representing the applied binary number.

The present invention improves upon the above described system by providing a unique position transducer in place of the coarse and fine potentiometers. In the embodiment shown in FIG. 1 the position transducer is linear in that it generates signals representing the position of a movable output member over a linear range of 32 inches instead of an angular output over a range of 32 revolutions as is done by the transducer in the system disclosed in the above-mentioned patent. The position transducer, which is designated generally by the reference number 11 in FIG. 1, comprises a 32-inch elongated resistor 13 in a straight line configuration. The resistor 13 is a conventional potentiometer slide-wire resistor and comprises a helical resistance wire wound on a core. One end 15 of the resistor 13 is grounded and the other end 17 is connected to one side of an A.C. power source 19, the other side of which is grounded.

A brush 21 makes sliding contact with the resistor 13 and is slidable along the resistor 13 from one end 15 to the other end 17. The brush 21 is fixed to the output member, which is designated by the reference number 23. The brush 21 slides along the resistor 13 as the output member moves through its 32-inch range. The signal produced on the brush 21 will be a coarse representation of the position of the output member 23 in its 32-inch range.

The transducer 11 also comprises 32 resistors 25, which are .030 inch short of being one inch long and which are spaced 0.030 inch apart colinearly along a line parallel with the resistor 13. Thus each of the resistors 25 is positioned opposite a different one of 32 one inch segments, into which the resistor 13 may be considered to be divided. The resistors 25 are conventional potentiometer resistors and each comprises a resistance wire wound helically upon a core.

As illustrated in FIG. 1 the left end terminal of each of the resistors 25 is designated by the reference number 27 and the right end terminal of each of the resistors 25 is designated by the reference number 29. Thirty-two variable resistors 31 severally connect the end terminals 27 of the resistors 25 to ground. Thirty-two variable resistors 33 severally connect the end terminals 29 of the resistors 25 to the ungrounded side of the A.C. power source 19. Thus A.C. power from the source 19 is applied across each of the resistors 25.

A pair of brushes 35 and 37 fixed one-half inch apart and to the movable output member 23 make sliding contact with the resistors 25, which successively come into contact with the brushes 35 and 37 as the member 23 moves throughout its 32 inch range.

In operation the signal produced on the brush 21 indicates in which one inch segment of its 32 inch range the output member 23 is in and the signals produced on the brushes 35 and 37 provide the fine indication of precisely where in this one inch segment the output member 23 is in. The signal produced on the brush 37 will directly indicate the position of the output member 23 in a given one inch segment whereas a signal produced on the brush 35 will indicate the output position of the member 23 for a given segment plus or minus one-half inch. The brush 35 is used to provide the fine indication of the position of the output member 23 in addition to the brush 37 so that when the brush 37 is between two resistors 25, an output signal providing a fine indication will be provided from the brush 35.

In operation the resistors 31 and 33 are adjusted to values such that each series circuit comprising a resistor 31, a resistor 25 and a resistor 33 has the same resistance that each of the resistors 25 would have if they were precisely one inch long. The resistors 31 and 33 in effect provide that part of the short resistors 25 which is missing from the 0.03 inch gaps between the short resistors 25. If the resistors 25 were precisely located in their proper positions and all the resistors 25 were precisely .970 inch long, then when the resistors 31 and 33 were properly adjusted the voltage drop across each of the resistors 25 would be identical. The resistors 31 and 33 are adjusted in a practical embodiment to account for variations in length and positioning of the resistors 25 so that the signals produced on the brushes 35 and 37 will be the same as if the resistors 25 were precisely of the correct length and in the correct positions.

Signals produced on the brushes 35 and 37 and on the brush 21 are compared with an applied 13 digit binary number representing the position to which the output member 23 is to be driven. The following table indicates the displacement from the zero position that a one in each digit of the applied binary number indicates:

Table

| Order of significance: | Displacement, inches |
| --- | --- |
| 1 | 16 |
| 2 | 8 |
| 3 | 4 |
| 4 | 2 |
| 5 | 1 |
| 6 | ½ |
| 7 | ¼ |
| 8 | ⅛ |
| 9 | 1/16 |
| 10 | 1/32 |
| 1 | 1/64 |
| 12 | 1/128 |
| 13 | 1/256 |

The precise position indicated by an applied binary number can be determined by assigning the proper displacement as indicated in the above table to each binary digit comprising a one and then adding all of the assigned displacements together. The position represented by the applied binary number will have the displacement from the zero position indicated by the resulting sum.

The signal produced on the brush 21 is applied to a coarse error signal generating circuit 39, which also receives signals representing the eight most significant digits of the applied binary number. The circuit 39 generates an analogue signal which corresponds to the signal which would be produced on the brush 21 if the output member were positioned at a displacement from the zero position equal to the total displacement indicated by the eight most significant digits of the applied binary number plus 1/16 of an inch. The added 1/16 of an inch is due to the fact that the brush 21 is mounted to lag the brush 37 by 1/16 of an inch for reasons to be explained below. This analogue signal produced by the circuit 39 is easily generated by means of a ladder network because it will be proportional to that part of the applied binary number consisting of its eight most significant digits.

The circuit 39 generates an output signal representing the difference between this analogue signal and the signal actually produced on the brush 21. This output signal of the circuit 39 is the coarse error signal. The signals generated on the brushes 35 and 37 are applied to a fine error signal generating circuit 41, which selects the signal from one of the brushes 35 and 37 and compares it with the eight least significant digits of the applied binary number to generate an error signal representing the difference between the position of the brush 37 and the position represented by the eight least significant digits of the applied digital number. The fine error signal generating circuit 41 selects the brush 35 or the brush 37 to compare with the applied binary number depending upon whether the sixth and seventh most significant digits are the same or are different.

If the sixth and seventh most significant digits of the applied binary number are different the brush 37 will be selected and if the sixth and seventh most significant digits are the same, the brush 35 will be selected. The fine error signal generating circuit 41 converts the eight least significant digits into the analogue signal that would be produced on the selected one of the brushes 35 and 37 if the output member were positioned in a given one inch segment displaced from the end of such segment nearest the zero position of the output member by an amount equal to the displacement represented by the eight least significant digits of the applied binary number. This analogue signal is easily generated by a ladder circuit if the brush 37 is selected because it will be proportional to that part of the binary number comprising the eight least significant digits. However since the brush 35 is displaced ½ inch from the brush 37, the signal which would be produced on it when the output member is correctly positioned in a given one inch segment will not be proportional to the eight least significant digits of the applied binary number but will be proportional to this number with the sixth most significant digit of the applied binary number complemented. Accordingly when the brush 35 is selected, the circuit 41 complements the sixth most significant digit and then converts the member into an analog signal by means of a ladder circuit. The circuit then generates an error signal proportional to the difference between the analog signal derived from the eight least significant digits of the applied binary number and the signal produced on the selected one of the brushes 35 and 37. The error signal thus produced is referred to as the fine error signal. The brush 37 is selected when the sixth and seventh most significant digits of the applied digital number are different and the brush 35 is selected when these digits are the same because the position represented by the applied number will be in the middle half-inch of one of the resistors 25 when the sixth and seventh most significant digits are different and will be in a half-inch overlapping the gap between two resistors 25 when the sixth and seventh most significant digits are the same. The details of coarse and fine error generating circuits 39 and 41 are fully disclosed in the above-mentioned U.S. Patent No. 3,226,617.

The fine and coarse error signals generated by circuits 39 and 41 are applied to a coarse or fine error selector circuit 43 which selects one of the two applied signals and applies it to an amplifier 45. If the absolute value of the coarse error signal plus or minus the fine error signal represents an error of greater than $7/_{16}$ of an inch then the selector circuit 43 will select the coarse error signal and apply it to the amplifier 45 and if the absolute value of the coarse error signal plus or minus the fine error signal represents a value less than $7/_{16}$ of an inch the fine error signal will be selected. The amplifier 45 amplifies the applied signal and applies it to a motor 47 which drives the member 23 through a drive mechanism 49 in a direction to reduce the applied error signal. Thus when a digital number is applied to the digital input of the system it will drive the output member 23 first in a direction to reduce the coarse error signal until the coarse error signal plus or minus the fine error signal represents an error of less than $7/_{16}$ of an inch, whereupon the system will drive the member 23 in a direction to reduce the fine error signal until the fine error signal is reduced to zero, at which time the member 23 will be precisely positioned at the position represented by the applied digital number. Because of the fact that the coarse and fine error signal selection depends upon whether the magnitude of the coarse error signal plus or minus the fine error signal represents an error of less than $7/_{16}$ of an inch, it is highly unlikely that gross system error, such as switching to fine control when the output member is positioned in the wrong segment, or never switching to fine control, will ever occur. The fact that the brush 21 lags the brush 37 by $1/_{16}$ of an inch is a further aid in the fine and coarse error signal selection. The fine error signal selector circuit 43 is fully disclosed in the above-mentioned U.S. Patent No. 3,226,617.

The transducer 11 has applications other than in the system disclosed in FIG. 1. For example the transducer 11 could be used in place of the coarse and fine potentiometers in the analogue to digital converter disclosed in the copending application Serial No. 262,578, filed on March 4, 1963 by Marvin Masel and assigned to the same assignee as the present invention.

FIGURE 2 illustrates another embodiment of a position transducer in accordance with the present invention. The position transducer of FIG. 2 generates signals representing the angular position of a rotatable shaft instead of a linearly movable member as does the transducer 11 used in the system shown in FIG. 1. The range of the position transducer of FIG. 2 is one revolution although motion is not bounded in that it can be rotated through the 0 or 360° position. The angular position transducer as shown in FIG. 2 comprises a slide wire elongated resistor 51 disposed in an angular configuration mounted concentrically about an axis 53. The resistor 51 is a conventional potentiometer resistor and comprises a resistance wire wound helically about a core. Two brushes 55 and 57 slidably engaging the resistor 51 are fixed to rotate with a rotatable shaft 58 about the axis 53. The angular position of the shaft 58 is what the output signals of the transducer represents. One end 59 of the resistance 51 is grounded and the other end 61 is connected to a source 63 of A.C. power. As the output shaft 58 rotates, the brushes 55 and 57 slide along the resistor 51 and have signals generated thereon representing their angular positions which are 180° apart. Since the brushes 55 and 57 are fixed to rotate with the output shaft 58, the angular position of the output shaft can be determined by the signal generated on the brush 55 or the signal generated on the brush 57. Spaced radially inward from the slide wire resistor 51 are thirty-six arcuate slide wire resistors 65 each positioned in a different 10° sector of the circle defined by the resistor 51 about the axis 53. Each of the slide wire resistors 65 has an arcuate length of slightly less than 10° so they are angularly spaced from each other about the axis 53. The slide wire resistors 65 are similar to conventional potentiometer resistors in that they comprise resistance wires wound helically about a common core, but they each extend only through a small arc of less than 10°. A pair of brushes 67 and 69 spaced 5° apart slidably engage the resistors 65 and are fixed to rotate about the axis 53 with the output shaft 58. As the output shaft 58 rotates, the brushes 67 and 69 slide along the resistors 65, which successively come into contact with them. One corresponding end terminal of each of the resistors 65 is designated by the reference number 71 and the other corresponding end terminal is designated by the reference number 73. Thirty-six variable resistors 75 severally connect the end terminals 71 of the resistors 65 to an annular conductor 76, which is disposed concentrically about the axis 53 and which is connected to the A.C. source 63. Thirty-six variable resistors 77 severally connect the end terminals 73 to an annular conductor 81, which is grounded. In this manner, A.C. power is applied across each of the resistors 65. The resistors 75 and 77 in operation are adjusted in the same manner that the trimming resistors 31 and 33 are adjusted in the transducer 11 illustrated in FIGURE 1. As a result of the A.C. voltage applied across the resistors 65, signals will be generated on the brushes 67 and 69 representing their angular position in the 10° sector in which they are presently located. The signals produced on the brushes 67 and 69 together with the signals produced on the brushes 55 and 57 can be used to precisely indicate the angular position of the output shaft 58. The signals on the brushes 55 and 57 indicate in which of the sectors the brushes 67 and 69 are located and the signals on the brushes 67 and 69 indicate the precise angular position of the output shaft 58 in a given 10° sector. Thus the signals produced on the brushes 55 and 57 coarsely indicate the angular position of the output shaft 58 whereas the signals on the brushes 67 and 69 provide a fine indication of the output shaft position. Two brushes spaced 5° apart are used to provide the fine indication so that a signal will always be available from one of the brushes even though the other one is between two resistors 65. The signal on the brush 69 directly indicates the output shaft position in any 10° sector while the signal produced on brush 67 indicates the output shaft position in any 10° sector minus 5°. Two brushes are used to provide the coarse indication for the same reason that two brushes are used to provide the fine indication; that is, when one of the brushes 55 and 57 is between the end terminals 59 and 61, a signal will be available coarsely representing the angular position of the output shaft from the other brush. The signal produced on the brush 57 coarsely represents the angular position of the output shaft 58 and the signal produced on the brush 55 represents the angular position of the output shaft minus 180°. A system similar to that shown in FIG. 1 can be used to position the output shaft 58 in accordance with applied digital signals. In such a system means would be required to select one of the brushes 55 and 57 as well as one of the brushes 67 and 69.

The position transducer shown in FIG. 1 can be greatly enlarged to several feet in size to provide precise positioning over a linear range of several feet. Similarly the diameter of the position transducer of FIG. 2 may be enlarged to several feet to position large telescopes or antennas with an accuracy measured in seconds of an arc. The large size position transducers of the present invention are more practical than the inductive, capacitive, or moire fringe interference counterparts of the prior art because the need for close spacing and parallelism between rotor and stator over large areas is eliminated.

In some applications it may be desirable to provide an intermediate error signal between the coarse and fine error signals. To provide such an intermediate signal a set of intermediate resistors would be provided extending colinearly along the long resistor, and a set of fine resistors would be provided for each intermediate resistor. These and many other modifications may be made to the above described specific embodiments of the invention without departing from the spirit and scope of the invention, which is defined in the appended claims.

What is claimed is:

1. A position transducer comprising: an elongated first resistor disposed along a straight line; a brush making sliding electrical contact with said first resistor; a multiplicity of second resistors shorter than said first resistor and extending along a straight line parallel to said first straight line; a pair of second brushes positioned to make sliding electrical contact with said second resistors and fixed with respect to each other and said first brush to slide over said second resistors coming successively into contact therewith as said first brush slides along said first resistor; said second brushes being spaced apart by an amount equal to one-half the length of one of said second resistors plus the spacing between two adjacent ones of said second resistors; a first multiplicity of variable resistors each connected to a different one of said second resistors; a second multiplicity of variable resistors each connected to a different one of said second resistors; said variable resistors of said first multiplicity being connected to one side of said second resistors and said variable resistors of said second multiplicity being connected to the opposite side of said second resistors so that a multiplicity of series circuits is formed each comprising one of said second resistors, one variable resistor of said first multiplicity, and one variable resistor of said second multiplicity, and means to apply an A.C. voltage across said first resistor and across each of said series circuits.

2. A position transducer comprising an elongated first resistor extending along the arc of a first circle and having an angular length of almost 360°; thirty-six second resistors extending along arcs of a second circle coaxial with said first circle and each positioned in a different 10° sector of said second circle; a first pair of brushes fixed with respect to each other 180° apart making sliding electrical contact with said first resistor; a second pair of brushes positioned to make sliding electrical contact with said second resistors and fixed with respect to each other and said first pair of brushes to slide over said second resistors coming successively into contact therewith as said first pair of brushes slide along said first resistor, said second pair of brushes being spaced 5° apart; thirty-six variable third resistors each connected to a different one of said second resistors; thirty-six variable fourth resistors each connected to a different one of said second resistors; said third resistors being connected to one side of said second resistors and said fourth resistors being connected to the opposite side of said second resistors so that thirty-six series circuits are formed each comprising one of said second resistors, one of said third resistors and one of said fourth resistors; and means to apply an A.C. voltage across said first resistor and each of said series circuits.

References Cited by the Examiner

UNITED STATES PATENTS

| | | | |
|---|---|---|---|
| 2,448,783 | 7/1948 | De Giers et al. | 338—124 X |
| 2,630,481 | 3/1953 | Johnson et al. | 318—28 X |
| 2,630,552 | 3/1953 | Johnson et al. | 318—28 |
| 2,662,144 | 12/1953 | Wilentchik | 323—94 |
| 2,751,475 | 6/1956 | Gottscholl | 338—128 |
| 3,064,168 | 11/1962 | Dosch | 318—28 |
| 3,226,617 | 12/1965 | Smith et al. | 318—28 |

ORIS L. RADER, *Primary Examiner.*

JOHN F. COUCH, *Examiner.*

B. DOBECK, *Assistant Examiner.*